United States Patent Office 3,127,830
Patented Apr. 7, 1964

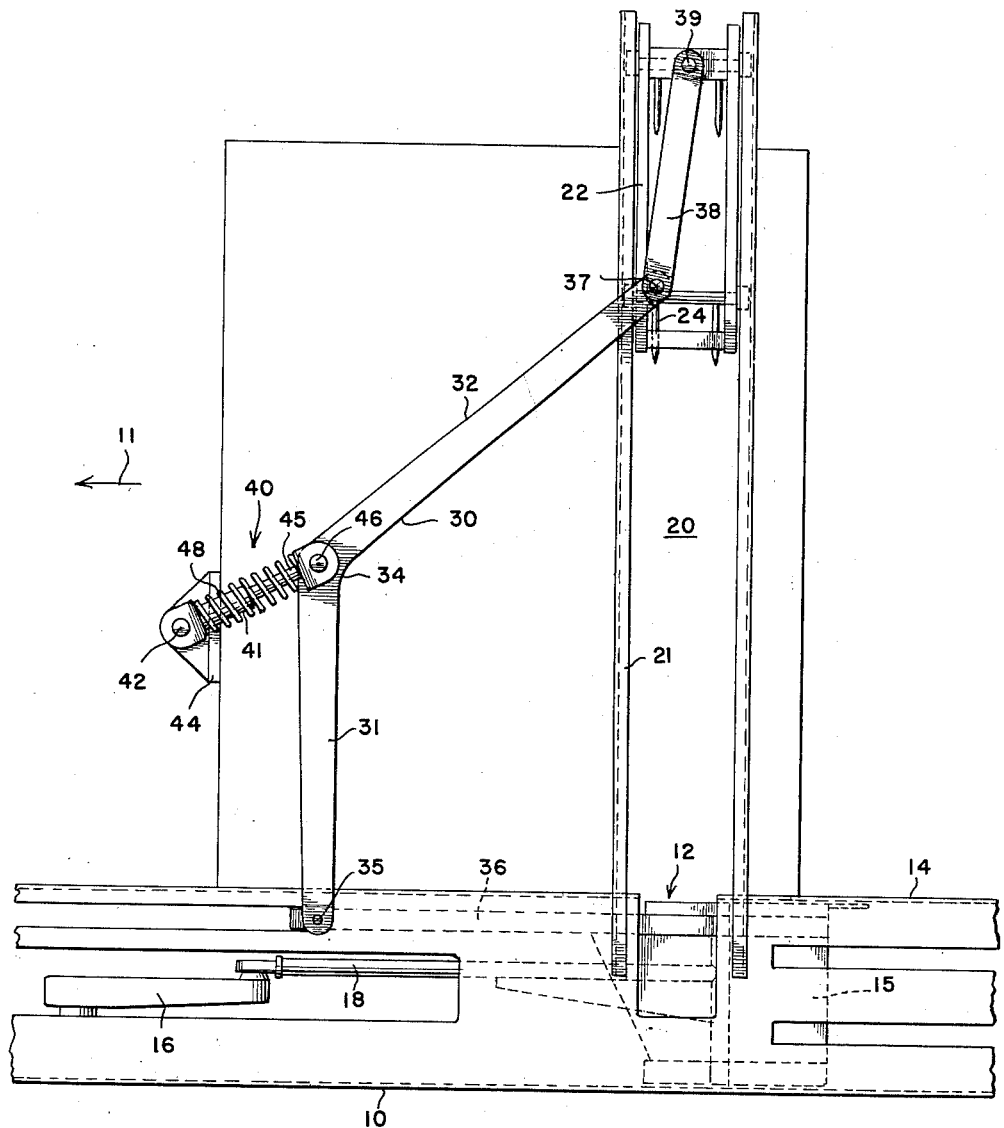

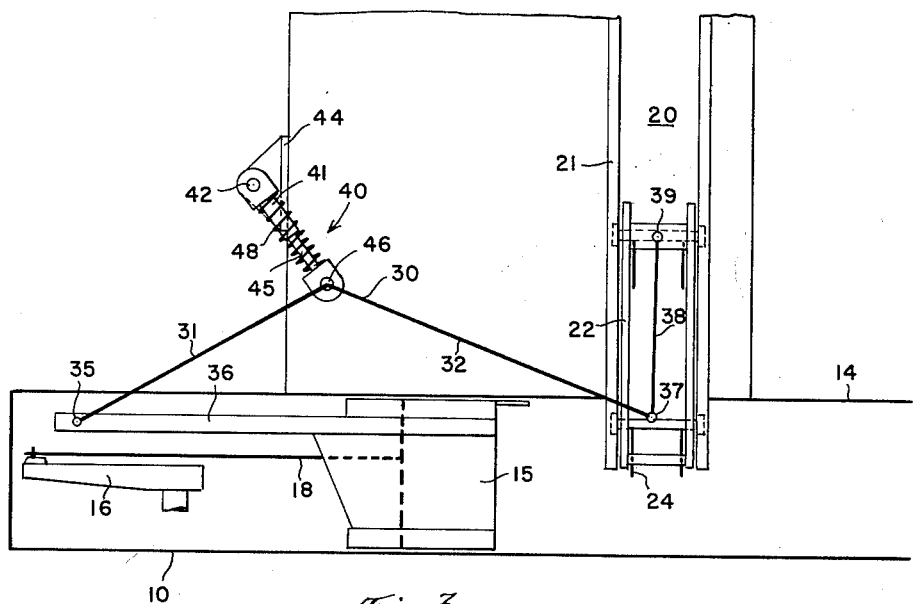
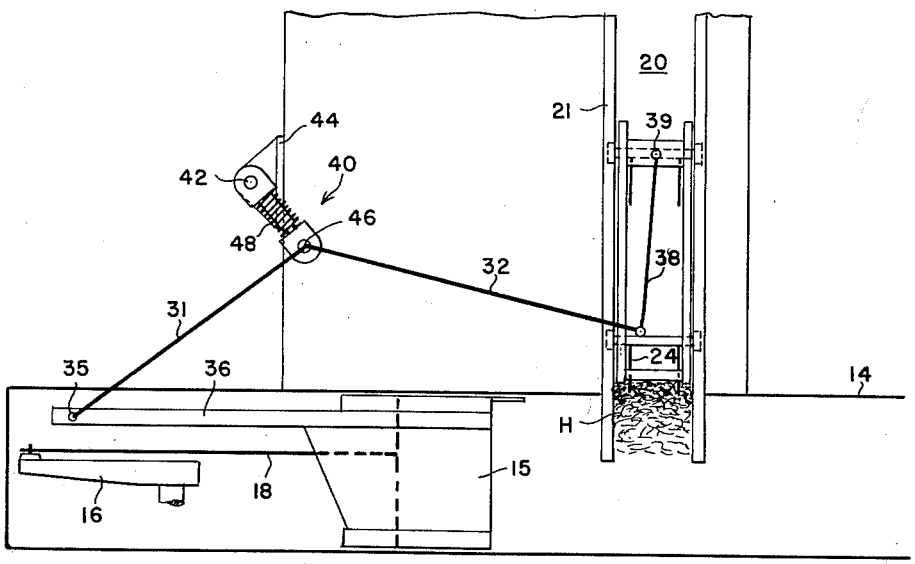

3,127,830
HAY BALER
James W. McDuffie, New Holland, Pa., assignor to Sperry Rand Corporation, New Holland, Pa., a corporation of Delaware
Filed Jan. 31, 1963, Ser. No. 255,283
3 Claims. (Cl. 100—142)

This invention relates generally to hay balers and more particularly to an improved drive means for reciprocating a baler feeder in timed relation to a plunger with which it is operable.

One object of this invention is to provide a positive drive connection between a baler plunger and feeder, yieldable means being operatively related to but separate from the connection.

Another object of this invention is to provide a simple, rugged drive for a baler feeder and having related thereto spring means to allow the feeder to yield on a feeding stroke.

A further object of this invention is to provide a feeder drive of the character described which will allow a feeder to yield on a feeding stroke without disrupting the timed relation between the feeder and the baler plunger.

Other objects of this invention will be apparent hereinafter from the specification and from the recital in the appended claims.

In the drawings:

FIG. 1 is a generally fragmentary plan view of a hay baler in which a reciprocable feeder is driven from the baler plunger, the drive connection employed being constructed according to this invention;

FIG. 2 is a diagrammatic plan view similar to FIG. 1 but on a smaller scale and showing the feeder at the end of a normal working stroke; and FIG. 3 is a view similar to FIG. 2 but showing the feeder in a yielded position on a feeding stroke responsive to an overloading condition.

Referring now to the drawings by numerals of reference, and particularly to FIG. 1, 10 denotes an elongated baler bale case which extends in a fore-and-aft direction relative to the travel of the baler as indicated by the arrow 11. Bale case 10 has an infeed opening 12 in a side wall 14 thereof. Operable in the bale case is a plunger 15 which is reciprocated by means of a crank arm 16 and connecting rod 18. The power for reciprocating the plunger is derived from a suitable source, not shown, such as an engine mounted on the baler or a power-take-off connection to the tractor which tows the baler. In FIG. 1, the plunger is shown extended and at the end of a compressing stroke. It is retractable from such position to a location forwardly of the opening 12 in bale case 10 as shown in FIGS. 2 and 3.

Extending laterally from the bale case is a feed platform 20 onto which crop material is adapted to be deposited from a suitable conventional pickup mechanism, not shown. Extending transversely of the bale case 10 is a track 21 which is mounted above platform 20. Supported on track 21 and reciprocable thereover is a feeder carriage 22 having depending feed finger 24 adapted to engage hay on the platform 20 and convey it toward bale case 10.

For reciprocating carriage 22 in precise timed relation to plunger 15, a bell crank 30 is provided having a first leg 31 and a second leg 32 interconnected at apex 34. The legs 31 and 32 comprise one continuous piece of steel and the angular relationship of the legs is fixed. Leg 31 is pivotally connected at 35 to a trailing portion 36 of the plunger 15. The pivotal connection at 35 is located in a given fixed relationship to plunger 15. The leg 32 of bell crank 30 is pivotally connected at 37 to an arm 38 pivotally connected at 39 to feeder carriage 22.

Bell crank 30 is carried on floating pivot means 40 comprising a sleeve member 41 pivotally supported at 42 on bracket 44. Sleeve 41 telescopically receives rod member 45, the outer end of which is pivotally connected to bell crank 30 by pivot pin 46. The axis of pin 46 is vertical and located on the apex 34 of the bell crank. Interposed between pivotal connections 42 and 46 is a compression spring 48 under tension and constantly urging rod member 45 in an axial direction away from sleeve member 41. Stop means, not shown, limits the outward movement of member 45.

In operation, when the plunger 15 is reciprocated, bell crank 30 is oscillated about the vertical axis provided by pin 46. As the bell crank is oscillated, feeder carriage 22 is reciprocated. In its oscillations, the vertical pivot axis of bell crank 30 continually shifts relative to bale case 10, this free floating of the bell crank being provided by the floating pivot structure 40. Normally, the vertical axis of pin 46 travels in an arc about the axis of pivotal connection 42. When the feeding of hay into bale case 10 is normal and when the plunger is retracted and the feeder is at the end of a working stroke, the various parts of the feeder drive are substantially as shown in FIG. 2. However, if an overload infeed condition results, by an excess amount of hay H in front of feed fingers 24, spring 48 is compressed and the rod 46 is forced inwardly of the sleeve 41 to allow the carriage 22 to yield as shown in FIG. 3. On the next retracting stroke of the feeder, the compression spring 48 will again expand to return the parts to their original position.

With the structure described, the drive connection between the plunger 15 and carriage 22 is positive. The yieldable means provided by the spring 48 is separate from but operatively associated with the drive connection. The structure thus provided is rugged and simple whereby the drive will withstand rugged operation and have a long life.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A hay baler comprising an elongated bale case having a feed opening in a side wall thereof, a plunger reciprocal in said bale case and movable from a retracted position forwardly of said opening to an extended position rearwardly thereof, a hay receiving platform extending laterally from said one side wall, a track extending transverse to said bale case and supported above said platform and bale case in register with said opening, a feeder carriage mounted on said track and movable rectilinearly thereover toward and away from said bale case, depending finger means on said carriage and engageable with hay on said platform to feed the hay into said bale case through said opening, a bell crank oscillatable about a vertical axis, said bell crank having an apex from which a first leg and a second leg extend in fixed angular relation to each other, means pivotally connecting said first leg to said plunger at one location only on the leg, an arm having one end pivotally connected to said carriage, means pivotally connecting an opposite end of said arm to said second leg of the bell crank, floating pivot means supporting said bell crank at said apex and permitting said vertical axis to shift relative to said bale case upon oscillation of the bell crank responsive to reciprocation of said plunger, and means fixed relative to said bale case for carrying said floating pivot means.

2. A hay baler comprising an elongated bale case having a feed opening in a side wall thereof, a plunger reciprocal in said bale case and movable from a retracted position forwardly of said opening to an extended position rearwardly thereof, a hay receiving platform extending laterally from said one side wall, a track extending transverse to said bale case and supported above said platform and bale case in register with said opening, a feeder carriage mounted on said track and movable rectilinearly thereover toward and away from said bale case, depending finger means on said carriage and engageable with hay on said platform to feed the hay into said bale case through said opening, a bell crank oscillatable about a vertical axis, said bell crank having an apex from which a first leg and a second leg extend in fixed angular relation to each other, means pivotally connecting said first leg to said plunger at one location only on the leg, an arm having one end pivotally connected to said carriage, means pivotally connecting an opposite end of said arm to said second leg of the bell crank, and floating pivot means supporting said bell crank at said apex and permitting said vertical axis to shift relative to said bale case upon oscillation of the cell crank responsive to reciprocation of said plunger, said supporting means comprising a pair of members telescopically related, means pivotally connecting one of said members to said bell crank, and means pivotally carrying the other of said members in a given fixed location relative to said bale case.

3. A hay baler comprising an elongated bale case having a feed opening in a side wall thereof, a plunger reciprocal in said bale case and movable from a retracted position forwardly of said opening to an extended position rearwardly thereof, a hay receiving platform extending laterally from said one side wall, a track extending transverse to said bale case and supported above said platform and bale case in register with said opening, a feeder carriage mounted on said track and movable rectilinearly thereover toward and away from said bale case, depending finger means on said carriage and engageable with hay on said platform to feed the hay into said bale case through said opening, a bell crank oscillatable about a vertical axis, said bell crank having an apex from which a first leg and a second leg extend in fixed angular relation to each other, means pivotally connecting said first leg to said plunger at one location only on the leg, an arm having one end pivotally connected to said carriage, means pivotally connecting an opposite end of said arm to said second leg of the bell crank, and floating pivot means supporting said bell crank at said apex and permitting said vertical axis to shift relative to said bale case upon oscillation of the bell crank responsive to reciprocation of said plunger, said supporting means comprising a pair of members telescopically related, means pivotally connecting one of said members to said bell crank, means pivotally carrying the other of said members in a given location relative to said bale case, and a compression spring under tension urging said one member axially away from said other member.

References Cited in the file of this patent
UNITED STATES PATENTS

| 835,054 | Bright | Nov. 6, 1906 |
| 860,557 | Moore | July 16, 1907 |
| 1,408,599 | Jones | Mar. 7, 1922 |
| 2,720,073 | Freeman et al. | Oct. 11, 1955 |
| 2,926,601 | Tarbox et al. | Mar. 1, 1960 |